United States Patent [19]

Heide et al.

[11] Patent Number: 4,739,009

[45] Date of Patent: Apr. 19, 1988

[54] PREPARATION OF BEAD POLYMERS BASED ON WATER-SOLUBLE ETHYLENICALLY UNSATURATED MONOMERS BY REVERSE SUSPENSION POLYMERIZATION

[75] Inventors: Wilfried Heide, Freinsheim; Heinrich Hartmann, Limburgerhof; Christos Vamvakaris, Kallstadt, all of Fed. Rep. of Germany

[73] Assignee: BASF Aktiengesellschaft, Ludwigshafen, Fed. Rep. of Germany

[21] Appl. No.: 36,737

[22] Filed: Apr. 10, 1987

[30] Foreign Application Priority Data

Apr. 18, 1986 [DE] Fed. Rep. of Germany ....... 3613081

[51] Int. Cl.$^4$ .............................................. C08F 2/32
[52] U.S. Cl. .................................... 524/801; 523/337; 526/209
[58] Field of Search .................... 523/337; 524/801; 526/209

[56] References Cited

U.S. PATENT DOCUMENTS

| | | |
|---|---|---|
| 4,052,353 | 10/1977 | Scanley ............................... 524/801 |
| 4,242,247 | 12/1980 | Pellon .................................. 524/801 |
| 4,461,866 | 7/1984 | Yanutola ............................. 524/801 |
| 4,539,368 | 9/1985 | Duncan ............................... 524/801 |
| 4,650,827 | 3/1987 | Becker ................................. 524/801 |
| 4,656,222 | 4/1987 | DeFazio ............................... 524/801 |

Primary Examiner—Paul R. Michl
Assistant Examiner—Terri Stevenson
Attorney, Agent, or Firm—Bill C. Panagos; Joseph D. Michaels

[57] ABSTRACT

Bead polymers are prepared by reverse suspension polymerization by a process in which an aqueous solution of water-soluble ethylenically unsaturated monomers are polymerized in an aliphatic hydrocarbon using an inorganic suspending agent based on a modified finely divided mineral and, in addition, from 0.1 to 5% by weight, based on the monomers used, of a nonionic surfactant, in the presence of a polymerization initiator, with the formation of a water-in-oil polymer suspension.

8 Claims, No Drawings

PREPARATION OF BEAD POLYMERS BASED ON WATER-SOLUBLE ETHYLENICALLY UNSATURATED MONOMERS BY REVERSE SUSPENSION POLYMERIZATION

U.S. Pat. No. 2,982,749 discloses a process for the preparation of bead polymers of water-soluble ethylenically unsaturated monomers, such as acrylamide, methacrylamide, acrylic acid, methacrylic acid, alkali metal and ammonium salts of 2-sulfoethyl acrylate and 2-aminoethyl methacrylate hydrochloride. In this process, an aqueous solution of the monomers is first dispersed in an organic solvent using an inorganic suspending agent which has a low hydrophilic-lipophilic balance to give a water-in-oil suspension, and the suspension is then polymerized in the presence of a polymerization initiator by heating the mixture at temperatures up to 100° C. with the formation of a water-in-oil polymer suspension. The suspending agents used in this procedure are, for example, silanized silica or finely divided minerals, such as kaolin or bentonite, which have been modified with organic amines. Suitable oil phases are aromatic hydrocarbons or chlorohydrocarbons. The particle diameters of the bead polymers prepared by this process are from about 10 μm to 2 mm. Although it is possible in most cases, with the aid of the known suspending agents, to prepare stable suspensions in aromatic hydrocarbons or chlorohydrocarbons as the oil phase, the system is not always sufficiently stable during the polymerization, so that agglomeration of the polymer beads is observed. If the oil phase is replaced with aliphatic hydrocarbons, the stability of the resulting water-in-oil suspensions is far lower. Coagulation of the polymer particles occurs during the polymerization.

European Patent Application 23,748 discloses an improvement of the process described above, which consists in using only those aminated bentonites or other aminated suspending agents whose content of unreacted amine is less than 0.5% by weight. In Examples 1 and 4, a small amount of sodium laurylsulfate, 1% by weight, based on the suspending agent, is added in order to reduce the content of free amine in the suspending agent. As is evident from the Examples of the European Patent Application, the polymerization is preferably carried out in xylene. It is also possible to use aliphatic or aromatic hydrocarbons or chlorohydrocarbons as the oil phase of the water-in-oil suspensions. However, the stability of water-in-oil suspensions which are prepared by dispersing an aqueous monomer solution in an aliphatic hydrocarbon using aminated bentonites and are virtually free of unreacted amine is so low that pronounced coagulation takes place during the polymerization. If, on the other hand, aromatic hydrocarbons or chlorohydrocarbons are used as the oil phase, it is possible to prepare bead polymers with the aid of the suspending agents described, but the said polymers contain certain amounts of oil phase. The oil phase adhering to the polymers cannot be removed completely from them by means of simple measures. The polymers therefore have an intense odor, and it also has to be borne in mind that chlorohydrocarbons and benzene are not physiologically tolerated.

It is an object of the present invention to provide a process for the preparation of bead polymers based on water-soluble ethylenically unsaturated monomers, in which polymerization can be carried out in physiologically tolerated solvents as the outer phase of a water-in-oil suspension.

We have found that this object is achieved, according to the invention, by a process for the preparation of bead polymers based on water-soluble ethylenically unsaturated monomers by reverse suspension polymerization, wherein an aqueous solution of the monomers is first dispersed in an aliphatic hydrocarbon using an inorganic suspending agent based on a modified finely divided mineral to give a water-in-oil suspension, and this suspension is then polymerized in the presence of a polymerization initiator with the formation of a water-in-oil polymer suspension, if the polymerization is additionally carried out in the presence of from 0.1 to 5% by weight, based on the monomers used, of a nonionic surfactant having an HLB value of from 2 to 16.

In the novel process, water-soluble monoethylenically unsaturated compounds are polymerized by the reverse suspension polymerization method. The most important members of the group of water-soluble ethylenically unsaturated monomers (a) are, for example, ethylenically unsaturated $C_3$–$C_5$-carboxylic acids, their amides and esters with aminoalcohols of the formula

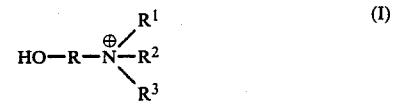

where R is $C_2$–$C_5$-alkylene and $R^1$, $R^2$ and $R^3$ are each H, $CH_3$, $C_2H_5$ or $C_3H_7$. These compounds are, for example, acrylic acid, methacrylic acid, crotonic acid, itaconic acid, maleic acid, fumaric acid, acrylamide, methacrylamide, crotonamide, dimethylaminoethyl acrylate, diethylaminoethyl acrylate, dimethylaminopropyl acrylate, dimethylaminobutyl acrylate, diethylaminoethyl methacrylate, dimethylaminoethyl methacrylate, dimethyl aminopropyl acrylate, dimethylaminoneopentyl acrylate and dimethylaminoneopentyl methacrylate. The basic acrylates and methacrylates are used in the form of their salts with strong mineral acids or carboxylic acids or in quaternized form. The anion $X^\ominus$ for the compounds of the formula I is the acid radical of the mineral acids or of the carboxylic acids, or methosulfate, ethosulfate or halogen from a quaternizing agent. Other water-soluble monomers of group (a) are N-vinylpyrrolidone, acrylamidopropanesulfonic acid, vinylphosphonic acid and/or alkali metal or ammonium salts of vinylsulfonic acid. The other acids can likewise be used in the polymerization either in unneutralized form or in partially or completely neutralized form. The monomers of group (a) can be employed in the polymerization either alone or as a mixture with one another, so that either homopolymers or copolymers are obtained. Preferred monomers of group (a) are acrylic acid, methacrylic acid, acrylamide and/or methacrylamide. These monomers can be copolymerized with one another in any ratio.

The polymerization of the monomers of group (a) can also be carried out in the presence of crosslinking agents (monomers of group (b)). The crosslinking agents contain two or more ethylenically unsaturated double bonds, examples of suitable crosslinking agents being N,N'-methylenebisacrylamide, polyethylene glycol diacrylates and polyethylene glycol dimethacrylates, each of which is derived from a polyethylene glycol having a molecular weight of from 126 to 8500, trimethylolpropane triacrylate, trimethylolpropane trimethacrylate, ethylene glycol diacrylate, propylene glycol diacrylate, butanediol diacrylate, hexanediol diacrylate, hexanediol dimethacrylate, diacrylates and dimethacrylates of block copolymers of ethylene oxide and propylene oxide, adducts of ethylene oxide and/or propylene oxide with trimethylolpropane, the said adducts being diesterified or triesterified with acrylic acid or methacrylic acid, polyhydric alcohols, such as glycerol or pentaerythritol, which are diesterified or polyesterified with acrylic acid or methacrylic acid, and triallylamine, tetraallylethylenediamine, divinylbenzene, diallyl phthalate, polyethylene glycol divinyl ether, trimethylolpropane diallyl ether, polyethylene glycol divinyl ether, butanediol divinyl ether, pentaerythritol triallyl ether and/or divinylethyleneurea. Water-soluble crosslinking agents are preferably used, for example N,N'-methylenebisacrylamide, polyethylene glycol diacrylates, polyethylene glycol dimethacrylates, pentaerythritol triallyl ether and/or divinylurea. The crosslinking agents are used in an amount of from 0.001 to 5, preferably from 0.01 to 2%, by weight, based on the mixture of monomers (a) and (b).

The water-soluble monomers of group (a) can be modified not only with the aid of the monomers of group (b) but, where a change in the properties of the polymers is desired, additionally with the monomers of group (c) or with the monomers of group (c) alone. Suitable monomers of group (c) are hydroxyethyl acrylate, hydroxypropyl acrylate, hydroxyethyl methacrylate, hydroxypropyl methacrylate, acrylonitrile and/or methacrylonitrile. Where the monomers of group (c) are used for modifying the water-soluble polymers, they are employed in an amount of from 0.5 to 30, preferably from 2 to 10, % by weight, based on the monomer mixtures, the sum of the percentages for the monomer mixtures always summing to 100.

The polymerization may be carried out in the presence or absence of the conventional polymerization regulators. Examples of suitable polymerization regulators are thio compounds, such as thioglycollic acid, mercaptoalcohols, e.g. 2-mercaptoethanol, mercaptopropanol and mercaptobutanol, dodecylmercaptan, formic acid and ammonia.

The polymerization is carried out in the presence of a conventional polymerization initiator, e.g. ammonium, sodium or potassium peroxydisulfate, a peroxide, such as dibenzoyl peroxide, dilauryl peroxide, di-2-ethylhexyl peroxydicarbonate, dicyclohexyl peroxydicarbonate, bis(4-tert-butylcyclohexyl) peroxydicarbonate, tert-butyl perpivalate, tert-butyl perbenzoate, tert-butyl permaleate, di-tert-butyl peroxide, tert-butyl hydroperoxide or hydrogen peroxide, and redox catalysts, suitable reducing components being iron(II) ammonium sulfate, ascorbic acid, sodium methylsulfinate, disodium bisulfite and sodium bisulfite. Azo initiators, such as azobisisobutyronitrile, 2,2'-azobis-(N,N'-dimethylisobutyramidine) dihydrochloride, 2,2'-azobis-(2-amidinopropane) dihydrochloride, 2,2'-azobis-(N,N'-dimethyleneisobutyraniline), 4,4'-azobis(4-cyanopentanecarboxylic acid) and 2-carbamylazoisobutyronitrile, are also suitable. The polymerization initiators can be used either alone or as a mixture. The rate of decomposition of peroxides which decompose at high temperatures can be reduced by using organic metal complexes, such as copper acetylacetonate, so that the decomposition rate of the peroxides can be adapted to the particular polymerization temperature chosen. The polymerization initiators are used in an amount of from 0.01 to 5, preferably from 0.2 to 3%, by weight, based on the monomers used in the polymerization.

For the polymerization, the monomers are dissolved in water, the monomer concentration in the aqueous solution being from 10% by weight to the saturation concentration, preferably from 30% by weight to the saturation concentration. The aqueous solution is then suspended in an aliphatic hydrocarbon. Suitable aliphatic hydrocarbons are $C_5$–$C_{10}$-alkanes, e.g. pentane, n-hexane, cyclohexane, heptane, n-octane, isooctane, nonane and decane, as well as mixtures of aliphatic hydrocarbons. The aliphatic hydrocarbon preferably used as the oil phase in the reverse suspension polymerization is cyclohexane. The weight ratio of the aqueous phase to the oil phase in the suspension polymerization is from 1:9 to 7:3.

In order to disperse the aqueous monomer solution in the aliphatic hydrocarbon, inorganic suspending agents based on modified finely divided minerals and, according to the invention, also a nonionic surfactant are required. The inorganic suspending agents, which have a low hydrophilic-lipophilic balance, are the agents conventionally used in reverse suspension polymerization processes. The mineral component of these substances is formed, for example, by bentonite, montmorillonite or kaolin. The finely divided minerals are modified by treating them with salts of long-chain amines, e.g. $C_8$–$C_{24}$-amines or quaternary ammonium salts, the amine salts or the quaternary ammonium salts being incorporated between the individual layers of the finely divided minerals. The unquaternized or quaternized ammonium salts used for the modification preferably contain 1 or 2 $C_{10}$–$C_{22}$-alkyl radicals. The other substituents of the ammonium salts are $C_1$–$C_4$-alkyl or hydrogen. The content of free ammonium salts in the amine-modified minerals is not more than 2% by weight. Finely divided minerals modified with ammonium salts are commercially available.

The inorganic suspending agents for the reverse suspension polymerization also include silica which has been reacted with organosilicon compounds. A suitable organosilicon compound is, for example, trimethylsilyl chloride.

The object of modifying the finely divided inorganic minerals is to improve the wettability of the minerals with the aliphatic hydrocarbon used as the outer phase of the reverse suspension polymerization. In the case of the natural minerals having a layer structure, e.g. bentonite and montmorillonite, modification with amines results in the modified minerals swelling in the aliphatic hydrocarbon and thus disintegrating into very fine particles. The particle size is about 1 $\mu$m, in general from 0.5 to 5 $\mu$m. The silicas reacted with organosilicon compounds have a particle size of from about 10 to 40 nm. The modified finely divided minerals are wet by both the aqueous monomer solution and the solvent and consequently accumulate at the phase boundary between the aqueous phase and the organic phase. They prevent coagulation when two aqueous monomer droplets collide in the suspension.

The stability of water-in-oil suspensions which contain a modified finely divided mineral as the suspending agent and an aliphatic hydrocarbon as the oil phase can surprisingly be increased by adding from 0.1 to 5% by weight, based on the monomers used, of a nonionic surfactant, so that the polymerization batches do not undergo coagulation or agglomeration.

The nonionic surfactants which are used in the reverse suspension polymerization process have an HLB value of from 2 to 16 (for a definition of the HLB value, see W. C. Griffin, J. Soc. Cosmetic Chem. 5 (1954), 249). Examples of suitable nonionic surfactants are $C_8$–$C_{12}$-alkylphenols which are oxyalkylated with ethylene oxide and/or propylene oxide. Examples of commercial products are octyl- and nonylphenols which have been reacted with from 4 to 20 moles of ethylene oxide per mole of phenol. Other nonionic surfactants which are used according to the invention are oxyethylated $C_{10}$–$C_{24}$-fatty alcohols and/or polyhydric $C_3$–$C_6$-alcohols which are partially esterified with $C_{10}$–$C_{24}$-fatty acids. These may additionally be reacted with from 2 to 20 moles of ethylene oxide. Examples of suitable fatty alcohols are palmityl alcohol, stearyl alcohol, myristyl alcohol, lauryl alcohol, oxo alcohols and unsaturated alcohols, e.g. oleyl alcohol. The fatty alcohols are oxyethylated to such a degree that they are soluble in water. In general, 1 mole of alcohol is reacted with from 2 to 20 moles of ethylene oxide in order to obtain surfactants having the HLB value stated above.

Examples of $C_3$–$C_6$-alcohols which are partially esterified and may be oxyethylated are glycerol, sorbitol, mannitol and pentaerythritol. These polyhydric alcohols are partially esterified with $C_{10}$–$C_{24}$-fatty acids, e.g. oleic acid, stearic acid or palmitic acid. The esterification with the fatty acids is carried out so that one or more OH groups of the polyhydric alcohol remain unesterified. Examples of suitable esterification products are sorbitan monooleate, sorbitan tristearate, mannitol monooleate, glycerol monooleate and glycerol dioleate. The stated fatty acid esters of polyhydric alcohols, which may contain one or more free OH groups, can then be reacted with ethylene oxide and/or propylene oxide. From 2 to 20 moles of ethylene oxide are used per mole of fatty acid ester. The degree of oxyethylation is known to affect the HLB value of the nonionic surfactants. By a suitable choice of the oxyethylation, it is possible to prepare surfactants which have an HLB value in the stated range. The nonionic surfactants can be used either alone or as a mixture with one another. This permits a large number of possible variations; for example, it is possible to employ surfactants having different degrees of oxyethylation, or oxyalkylated phenols together with oxyethylated fatty alcohols or oxyethylated fatty alcohol derivatives. From 0.2 to 3% by weight, based on the monomers used in the polymerization, of a nonionic surfactant are preferably used for stabilizing the suspension.

As is usual for polymerization processes, the reverse suspension polymerization is carried out in the absence of oxygen, preferably in a nitrogen atmosphere. The polymerization is carried out at from 35 to 100° C. under reduced or superatmospheric pressure. The polymerization is most simply carried out at the boiling point of the particular aliphatic hydrocarbon or of the particular aliphatic hydrocarbon mixture. In carrying out the polymerization, a water-in-oil suspension can first be prepared from the aqueous monomer solution and the aliphatic hydrocarbon. In this procedure, the inorganic suspending agent and the nonionic surfactant are used to promote dispersing of the aqueous solution in the hydrocarbon oil. The inorganic suspending agent and the nonionic surfactant can be added both to the aqueous monomer solution and to the aliphatic hydrocarbon. However, it is also possible to adopt a procedure in which the aliphatic hydrocarbon, the inorganic suspending agent and the nonionic surfactant are initially taken in a polymerization vessel, and an aqueous monomer solution is added with vigorous mixing so that a water-in-oil suspension is formed. The polymerization can then take place. In another polymerization procedure, only one part of the aqueous monomer solution is first dispersed in the aliphatic hydrocarbon, the polymerization is initiated, and the aqueous monomer solution is then run in at the rate at which the polymerization progresses. In this procedure, a water-in-oil polymer suspension forms above a water-in-oil monomer suspension. This gives bead polymers which have a particle size of from 1 $\mu$m to 2 mm, preferably from 50 $\mu$m to 1 mm, depending on the reaction conditions. When the polymerization is complete, the water-containing bead polymers can be isolated (for example by filtration or centrifuging) from the water-in-oil polymer suspension. However, the bead polymers, which still contain water from the preparation, can first be dried (for example by means of azeotropic distillation) and then separated off from the aliphatic hydrocarbon.

Depending on the polymerization conditions and the monomers used, the polymers obtained have different molecular weights, which are characterized by the K value. The Fikentscher K values are from 50 to 300 (measured in 5% strength aqueous sodium chloride solution at 25° C. and at a polymer concentration of 0.1%). The low molecular weight polymers are useful, for example, as sizes. High molecular weight polymers are used as flocculants, for example water-soluble polymers of acrylic acid and of acrylamide, copolymers of acrylic acid and acrylamide or copolymers of acrylamide and dimethylaminoethyl acrylate hydrochloride. Crosslinked polymers, for example copolymers of acrylic acid and methylenebisacrylamide, are used either as thickeners in printing pastes or as a water-absorbing material in diapers, depending on the degree of crosslinking. In order to achieve rapid water absorption during use as an absorbent for water, the bead polymers can be dusted with finely divided inorganic materials, e.g. bentonite, montmorillonite, kaolin, china clay and silica as well as with a thermally treated synthetic silica. Amounts as small as 0.2% by weight, based on the bead polymer, are sufficient to increase the rate of water absorption of the polymer compared with the untreated material.

In the Examples, parts and percentages are by weight. The K value was measured according to H. Fikentscher, Cellulose-Chemie 13 (1932), 48–64 and 71–74, in 5% strength aqueous sodium chloride solution at 25° C. and at a polymer concentration of 0.1% by weight; $K = k \times 10^3$. The K values can of course only be determined for the soluble polymers. The crosslinked copolymers cannot be characterized in this manner.

EXAMPLE 1

28 l of cyclohexane, 60 g of a commercial montmorillonite modified with dihexadecyldimethylammonium chloride and having a particle size of less than 2 $\mu$m and 15 g of a nonionic surfactant which is obtainable by reacting 8 moles of ethylene oxide with 1 mole of nonylphenol are initially taken in a 40 l steel kettle equipped with a stirrer, a reflux condenser and feed apparatuses. The stirred vessel is then heated to 60° C., and the mixture is brought to the boil by reducing the pressure.

A monomer solution is then prepared by adding 3900 g of acrylic acid and 4000 g of a 50% strength sodium hydroxide solution to 4972 g of water. 5.1 g of N,N'- methylenebisacrylamide and 26 ml of a 1% strength aqueous solution of sodium nitrilotriacetate are then added to this solution. The resulting solution is then freed from oxygen by means of a gassing column, mixed with a solution of 15.3 g of potassium peroxydisulfate in 500 ml of water and added in the course of one hour to the initially taken mixture boiling at 60° C. After the addition of the monomer solution, the reaction mixture is kept at 60° C. for a further hour. Thereafter, the water in the water-in-oil polymer suspension is distilled off azeotropically, and the bead polymer is separated from the cyclohexane by filtration. The polymer is then dried overnight at 60° C. in a drying oven under reduced pressure. Completely agglomerate-free spherical polymer beads having a particle size of from 100 to 400 $\mu$m are obtained.

The polymer obtained is divided into two equal parts. One part of the polymer is mixed with 25 g of a parts. One part of the polymer is mixed with 25 g of a finely divided synthetic silica (Aerosil 200), while the other part is mixed with 25 g of a finely divided china clay. The polymer beads which contain the inorganic materials on the surface are used as absorbents for water. Both samples absorb water at the same rate. The polymers can be used, for example, as linings in diapers for absorbing urine.

EXAMPLE 2

640 l of cyclohexane, 1500 g of a commercial montmorillonite modified with dihexadecyldimethylammonium chloride and 600 g of a nonionic wetting agent which is obtainable by reacting 1 mole of nonylphenol with 6 moles of ethylene oxide are initially taken in a 1600 l steel kettle equipped with a stirrer, a reflux condenser and feed apparatuses. The kettle contents are heated to 60° C. and refluxed by reducing the pressure.

A monomer solution which has been prepared by mixing 98 kg of water, 86 kg of acrylic acid and 80 kg of 50% strength aqueous sodium hydroxide solution and to which 110 g of N,N'-methylenebisacrylamide and 2.3 g of a 40% strength solution of sodium nitrilotriacetate and a solution of 336 g of potassium peroxydisulfate in 21 l of water have been added is introduced into the above mixture in the course of one hour. After the entire monomer solution has been added with constant stirring of the reaction mixture, the latter is polymerized for one hour at 60° C. under reflux. Thereafter, the water in the water-in-oil polymer suspension is distilled off azeotropically, and the polymer dried in this manner is filtered off from the cyclohexane and dried at 80° C. in a paddle dryer. During the drying procedure, 1.1 kg of a finely divided synthetic silica (Aerosil 200) are added. Completely agglomerate-free spherical polymer beads having a particle size of from 100 to 400 $\mu$m are obtained.

EXAMPLE 3

28 l of cyclohexane, 80 g of a commercial finely divided silica gel modified with trimethylsilyl chloride and having a particle diameter of from 10 to 40 nm and 30 g of an oxyethylated nonylphenol which is obtainable by oxyethylating nonylphenol with ethylene oxide in a molar ratio of 1:8 are initially taken in a 40 l steel kettle equipped with a stirrer, a reflux condenser and feed apparatuses. The contents of the kettle are then heated to 60° C. and brought to the boil by reducing the pressure.

A monomer solution is then prepared by mixing 4972 g of water, 3900 g of acrylic acid and 4000 g of 50% strength aqueous sodium hydroxide solution and then adding 5.1 g of N,N'-methylenebisacrylamide and 26 ml of a 1% strength solution of sodium nitrilotriacetate to this mixture. The solution is then freed from oxygen by means of a gassing column, mixed with a solution of 15.3 g of potassium peroxydisulfate in 500 ml of water and added in the course of one hour, with constant stirring, to the boiling, initially taken mixture. When the addition of the monomer is complete, the reaction mixture is further polymerized for one hour, and the resulting water-in-oil polymer suspension is then worked up by distilling off water azeotropically. The polymer is separated from the cyclohexane by filtration and is dried overnight at 60° C. in a drying oven under reduced pressure. Completely agglomerate-free, spherical polymer beads having a particle diameter of from 70 to 300 $\mu$m are obtained. The polymer is then mixed with 50 g of china clay. It is used in this form as an absorbent for water in diapers.

EXAMPLE 4

1.6 l of cyclohexane, 4 g of a commercial smectite modified with dioctadecyldimethylammonium chloride and 2 g of an oxyethylated $C^{10}$-alcohol (obtained by reacting 1 mole of the alcohol with 3 moles of ethylene oxide) are initially taken in a 4 l kettle equipped with a stirrer, a reflux condenser and a feed vessel. The initially taken mixture is then heated to 50° C. and brought to the boil by reducing the pressure.

A monomer solution consisting of 250 g of water, 223 g of acrylic acid and 203 g of 50% strength aqueous sodium hydroxide solution is then prepared. 280 mg of N,N'-methylenebisacrylamide, 0.6 ml of a 1% strength aqueous solution of sodium nitrilotriacetate and 1.12 g of potassium peroxydisulfate are added to this solution. The mixture is freed from oxygen by passing in nitrogen and is then added dropwise to the boiling, initially taken mixture in the course of one hour. This gives a water-in-oil suspension, from which a water-in-oil polymer suspension forms during the polymerization. Polymerization is continued for one hour. Thereafter, the water present in the polymer particles is removed by azeotropic distillation, and the polymer is isolated by filtration. It is dried overnight at 60° C. in a drying oven under reduced pressure. This gives a finely divided polymer having a particle size of from 100 to 400 $\mu$m. To increase the rate of water absorption, the finely divided polymer is mixed with 2.8 g of a finely divided china clay.

EXAMPLE 5

1.6 l of cyclohexane, 4 g of a commercial montmorillonite modified with dihexadecyldimethylammonium chloride and 2 g of a nonionic surfactant which is obtainable by an addition reaction of ethylene oxide with a $C_{13}/C_{15}$ oxo alcohol in a molar ratio of 3:1 are initially taken in a 4 l steel kettle equipped with a stirrer, a reflux condenser and a feed vessel. The contents of the kettle are heated to 50° C. and brought to the boil by reducing the pressure.

A monomer solution is then prepared by first mixing 250 g of water, 223 g of acrylic acid and 203 g of 50% strength aqueous sodium hydroxide solution and then adding 280 mg of N,N'-methylenebisacrylamide and 0.6 ml of a 1% strength aqueous solution of sodium nitrilotriacetate and 1.12 g of potassium peroxydisulfate to this solution. The mixture is then freed from oxygen by passing in nitrogen and is added in the course of one hour to the initially taken mixture boiling at 50° C. Polymerization is continued for one hour, after which the water present in the polymer particles is removed by azeotropic distillation. The polymer is then filtered off from the cyclohexane and dried overnight at 60° C. in a drying oven under reduced pressure. The resulting finely divided bead polymer has a particle size of from 150 to 600 μm. In order to increase the rate of water absorption of this polymer, it is dusted with 2.8 g of a finely divided kaolin.

EXAMPLE 6

1.6 L of cyclohexane, 4 g of a commercial montmorillonite modified with dihexadecyldimethylammonium chloride and 2 g of a nonionic surfactant which is obtainable by reacting sorbitan monooleate with ethylene oxide in a molar ratio of 1:5 are initially taken in a 4 l steel kettle equipped with a stirrer, a reflux condenser and a feed vessel. The kettle contents are heated to 60° C. and brought to the boil by reducing the pressure.

A monomer solution which is prepared by mixing 250 g of water, 223 g of acrylic acid and 203 g of a 50% strength aqueous sodium hydroxide solution and then adding 280 mg of N,N'-methylenebisacrylamide and 0.6 ml of a 1% strength solution of sodium nitrilotriacetate and 1.12 g of potassium peroxydisulfate to this solution is added, at 50° C., to this initially taken mixture. Before it is added to the initially taken mixture, this monomer mixture is freed from oxygen by passing in nitrogen. The reverse suspension polymerization is complete after polymerization has been continued for one hour. Thereafter, the water present in the polymer particles is removed by azeotropic distillation, and the polymer is separated from the cyclohexane by filtration and is dried overnight at 60° C. in a drying oven under reduced pressure. The resulting finely divided bead polymer has a particle size of from 50 to 200 μm. In order to increase the absorption rate of this polymer for water, it is dusted with 2.8 g of a finely divided kaolin.

EXAMPLE 7

1.6 l of cyclohexane and 4 g of a commercial montmorillonite modified with dihexadecyldimethylammonium chloride are initially taken in a steel kettle equipped with a stirrer, a reflux condenser and a feed vessel and are heated to 60° C. therein. The kettle content is brought to the boil by reducing the pressure.

For the reverse suspension polymerization, a monomer solution is prepared by first mixing 250 g of water, 2.23 g of acrylic acid and 2.03 g of a 50% strength aqueous sodium hydroxide solution and then adding to this solution 100 mg of a nonionic surfactant obtainable by reacting a $C_{12}/C_{14}$-fatty alcohol with ethylene oxide in a molar ratio of 1:8. 3 g of formic acid and 0.6 ml of a 1% strength aqueous solution of sodium nitrilotriacetate and 0.84 g of potassium peroxydisulfate are also added to the monomer solution. The latter is freed from oxygen by passing in nitrogen and is then added dropwise in the course of one hour to the boiling, initially taken mixture heated at 60° C. Polymerization is continued for one hour, after which the water present in the polymer particles is removed by azeotropic distillation. The kettle contents are filtered, and the finely divided bead polymer remaining on the filter is dried overnight at 60° C. in a drying oven under reduced pressure. The particle diameter of the polymer beads is from 100 to 400 μm, and the polymer has a K value of 90.

EXAMPLE 8

1.6 l of cyclohexane, 4 g of a commercial montmorillonite modified with dihexadecyldimethylammonium chloride and 2 g of a nonionic surfactant which is obtainable by an addition reaction of ethylene oxide with a $C_{16}/C_{18}$-fatty alcohol in a molar ratio of 11:1 are initially taken in a steel kettle equipped with a stirrer, a reflux condenser and a feed vessel. The constantly stirred kettle contents are heated to 45° C. and brought to the boil by reducing the pressure.

For the reverse suspension polymerization, a monomer solution is prepared by mixing 82 g of water, 390 g of 50% strength aqueous acrylamide solution, 85% of acrylic acid and 94 g of 50% strength aqueous sodium hydroxide solution and then adding 244 mg of formic acid and 15 ml of a 1% strength solution of sodium diethylenetriaminepentaacetate and 612 mg of 2,2'-azo-bis-(2-amidinopropane) dihydrochloride to this solution. The monomer solution is freed from oxygen by passing in nitrogen and then added dropwise in the course of one hour to the initially taken mixture boiling at 45° C. under reduced pressure. The reaction mixture is then polymerized for a further hour at the stated temperature, under reflux. Thereafter, the water present in the polymer particles is removed azeotropically, and the reaction mixture remaining in the kettle is filtered. The polymer filtered off is dried overnight at 60° C. in a drying oven under reduced pressure. The product is a finely divided bead polymer which has a particle size of from 80 to 400 μm and a K value of 270.

EXAMPLE 9

1.6 l of cyclohexane, 4 g of commercial montmorillonite modified with dihexadecyldimethylammonium chloride and 2 g of a nonionic surfactant obtainable by reacting a $C_{16}/C_{18}$-fatty alcohol with ethylene oxide in a molar ratio of 1:11 are initially taken in a 4 l steel kettle equipped with a stirrer, a reflux condenser and a feed vessel. The kettle contents are heated to 55° C. and brought to the boil by reducing the pressure.

The reverse suspension polymerization is carried out using a monomer solution which is prepared by mixing 280 g of water, 280 g of 50% strength aqueous acrylamide solution and 140 g of trimethylammonium ethylacrylate chloride and to which 280 ml of formic acid and 15 ml of a 1% strength aqueous solution of sodium diethylenetriaminepentaacetate and 560 mg of 2,2'-azo-bis-(2-amidinopropane) dihydrochloride is then added. The monomer mixture is then freed from oxygen by passing in nitrogen, after which it is added dropwise in the course of one hour to the initially taken mixture boiling at 55° C. under reduced pressure. Polymerization is continued for a further hour. Thereafter, the water present in the polymer particles is removed azeotropically. The polymer is then filtered off from the cyclohexane and dried overnight at 60° C. in a drying oven under reduced pressure. The finely divided bead polymer obtained has a particle size of from 100 to 400 μm and a K value of 230.

COMPARATIVE EXAMPLE 1

28 l of cyclohexane and 60 g of a commercial montmorillonite modified with dihexadecyldimethylammoniumchloride are initially taken in a 40 l steel kettle equipped with a stirrer, a reflux condenser and feed apparatuses. The kettle contents are heated to 60° C. and brought to the boil by reducing the pressure.

To carry out the reverse suspension polymerization, a monomer solution is prepared by mixing 4972 g of water, 3900 g of acrylic acid and 4000 g of 50% strength aqueous sodium hydroxide solution and then adding 5.1 g of N,N'-methylenebisacrylamide and 26 ml of a 1% strength aqueous solution of sodium nitrilotriacetate to this solution. This solution is freed from oxygen by means of a gassing column, combined with a solution of 15.3 g of potassium peroxydisulfate in 500 ml of water and added in the course of one hour to the initially taken mixture boiling at 60° C. under reduced pressure. Further polymerization was dispensed with since the entire mixture had already coagulated.

COMPARATIVE EXAMPLE 2

1.6 l of cyclohexane and 4 g of commercial smectite modified with dioctadecyldimethylammonium chloride are initially taken in a 4 l steel kettle equipped with a stirrer, a reflux condenser and a feed vessel. The contents of the kettle are heated to 50° C. and brought to the boil by reducing the pressure.

To carry out the reverse suspension polymerization, a monomer solution is prepared by first mixing 250 g of water, 223 g of acrylic acid and 2.03 g of 50% strength aqueous sodium hydroxide solution and adding 280 mg of N,N'-methylenebisacrylamide and 0.6 ml of a 1% strength solution of sodium nitrilotriacetate and 1.12 g of potassium peroxydisulfate to this solution. The mixture is freed from oxygen by passing in nitrogen and is then added dropwise in the course of one hour to the constantly stirred, initially taken mixture. The reaction mixture coagulates during the feed stage itself.

COMPARATIVE EXAMPLE 3

1.6 l of cyclohexane, 4 g of a commercial montmorillonite modified with dihexadecyldimethylammonium chloride and 40 mg of sodium laurylsulfate are initially taken in a 4 l steel kettle equipped with a stirrer, a reflux condenser and a feed vessel. The contents of the kettle are stirred at room temperature for one hour, heated to 50° C. and then brought to the boil by reducing the pressure.

In order to carry out the reverse suspension polymerization, a monomer solution is prepared by mixing 250 g of water, 223 g of acrylic acid and 203 g of 50% strength aqueous sodium hydroxide solution and then adding 280 mg of N,N'-methylenebisacrylamide, 0.6 ml of a 1% strength solution of sodium nitrilotriacetate, 35 mg of calcium hydroxide and 1.12 g of potassium peroxydisulfate to this mixture. The mixture is freed from oxygen by passing in nitrogen and then added dropwise to the constantly stirred, initially taken mixture in the course of one hour. The mixture coagulates during the feed stage itself.

COMPARATIVE EXAMPLE 4

1.6 l of cyclohexane and 4 g of a commercial montmorillonite modified with dihexadecyldimethylammonium chloride are initially taken in a steel kettle equipped with a stirrer, a reflux condenser and a feed vessel. The initially taken mixture is heated to 60° C. and brought to the boil by reducing the pressure.

To carry out the reverse suspension polymerization, a monomer mixture is prepared by mixing 250 g of water, 223 g of acrylic acid and 203 g of 50% strength aqueous sodium hydroxide solution and then adding 2 g of a commercial anionic surfactant (sodium salt of a fatty alcohol ether sulfate), 280 mg of N,N'-methylenebisacrylamide, 0.6 ml of a 1% strength solution of sodium nitrilootriacetate and 0.84 g of potassium peroxydisulfate to this solution. The monomer mixture is then freed from oxygen by passing in nitrogen, after which it is added dropwise to the constantly stirred, initially taken mixture in the course of one hour. The temperature during the polymerization and subsequent polymerization, which takes one hour, is 60° C. The water present in the polymer particles is then removed by azeotropic distillation. The polymer is filtered off from the cyclohexane and dried overnight at 60° C. in a drying oven under reduced pressure. This gives a finely divided agglomerate having a particle diameter of about 1–2 mm. The pourability and the rate of water absorption are poorer than those of bead polymers according to the Examples.

We claim:

1. A process for the preparation of a bead polymer based on water-soluble ethylenically unsaturated monomers by reverse suspension polymerization, wherein an aqueous solution of the monomers is first dispersed in an aliphatic hydrocarbon using an inorganic suspending agent based on a modified finely divided mineral selected from the group consisting of bentonite, montmorillonite, kaolin, and mixtures thereof, said minerals having been modified by treating them with a salt of $C_8$–$C_{24}$ long chain amines or their quaternary ammonium salts, and silica which has been reacted with trimethylsilochloride said modified finely divided minerals having a low hydrophilic-lipophilic balance and being essentially water insoluble, to give a water-in-oil suspension, and the suspension is then polymerized in the presence of a polymerization initiator and furthermore in the presence of from 0.1 to 5 percent by weight, based on the monomers used, of a nonionic surfactant having an HLB value of from 2 to 16, with the formation of a water-in-oil polymer suspension.

2. A process as claimed in claim 1, wherein a $C_8$–$C_{12}$-alkylphenol oxyalkylated with ethylene oxide and/or propylene oxide is used as the nonionic surfactant.

3. A process as claimed in claim 1, wherein oxyethylated $C_{10}$–$C_{24}$-fatty alcohols and/or oxyethylated polyhydric $C_3$–$C_6$-alcohols partially esterified with $C_{10}$–$C_{24}$-fatty acids are used as the nonionic surfactants.

4. A process as claimed in claim 1, wherein
(a) ethylenically unsaturated $C_3$–$C_5$-carboxylic acids, their amides or esters with aminoalcohols of the formula

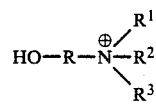

where R is $C_2$–$C_6$-alkylene and $R^1$, $R^2$ and $R^3$ are each H, $CH_3$, $C_2H_5$ or $C_3H_7$, or N-vinylpyrrolidone, acrylamidopropanesulfonic acid, vinylphosphonic acid and/or alkali metal or ammonium salts of vinylsulfonic acid are used as water-soluble ethylenically unsaturated monomers.

5. A process as claimed in claim 4, wherein the polymerization is additionally carried out in the presence of
(b) from 0.001 to 5% by weight, based on the monomer mixture, of a crosslinking agent.

6. A process as claimed in claim 4, wherein the polymerization of the monomers (a) is additionally carried out in the presence of (c) from 0.5 to 30% by weight, based on the monomer mixture, of hydroxyethyl methacrylate, hydroxypropyl acrylate, hydroxyethyl methacrylate, hydroxypropyl methacrylate, acrylonitrile and/or methacrylonitrile.

7. A process as claimed in claim 4, wherein (a) acrylic acid, methacrylic acid, acrylamide and/or methacrylamide are copolymerized with (b) from 0.001 to 5% by weight, based on the monomer mixture, of N,N'-methylenebisacrylamide, polyethylene glycol diacrylate, polyethylene glycol dimethacrylate, pentaerythritol triallyl ether and/or divinylurea.

8. The process of claim 1, wherein said quarternary ammonium salts used for modification contain from 1 to 2 $C_{10}$–$C_{22}$ alkyl radicals.

* * * * *